US006338875B1

(12) United States Patent
Boucher et al.

(10) Patent No.: US 6,338,875 B1
(45) Date of Patent: Jan. 15, 2002

(54) HEAT RESISTANT EMULSION RESINS

(75) Inventors: Steve Boucher, Hatfield; Paul Whyzmuzis, deceased, late of Hatfield, by Carol Whyzmuzis, executrix; Brenda Taipale, Sellersville; George A Smith, Newtown, all of PA (US); Joseph Sinka, Whitehouse Station, NJ (US); Ching Feng, Brookline, MA (US)

(73) Assignee: Cook Composites and Polymers Co., North Kansas City, MO (US)

( * ) Notice: Subject to any disclaimer, the term of this patent is extended or adjusted under 35 U.S.C. 154(b) by 46 days.

(21) Appl. No.: 09/723,132

(22) Filed: Nov. 27, 2000

Related U.S. Application Data

(62) Division of application No. 08/936,256, filed on Sep. 24, 1997, now Pat. No. 6,162,850.

(51) Int. Cl.[7] .............................. B05D 3/00; B05D 3/02
(52) U.S. Cl. ................. 427/372.2; 427/384; 427/385.5; 427/388.1; 427/389.9; 427/391; 427/392; 427/393
(58) Field of Search ............................. 427/372.2, 384, 427/385.5, 388.1, 389.9, 391, 392, 393

(56) References Cited

U.S. PATENT DOCUMENTS

| | | |
|---|---|---|
| 4,148,779 A | 4/1979 | Blackwell et al. |
| 5,750,617 A | 5/1998 | Eck et al. ................... 524/718 |

OTHER PUBLICATIONS

"Acrylic & Methacrylic Ester Polymers", Encyclopedia of Polymer Science and Engineering, vol. 1, pp 234–2999 (John Wiley & Sons, Inc. NY, NY, 1985).

"Emulsion Polymerization", Encyclopedia of Polymer Science and Engineering, vol. 6, pp 1–51 (John Wiley & Sons, Inc., NY, NY, 1986).

"Styrene Polymers", Encyclopedia of Polyme Science and Engineering, vol. 16, pp 1–21, (John Wiley & Sons, Inc. NY, NY, 1989).

"Coating Methods", Encyclopedia of Polymer Science and Engineering, vol. 3, pp 552–671 and sup. vol. pp 53, 109 and 110, (John Wiley & Sons, Inc. NY, NY, 1985).

"Printing Ink Vehicle", Encyclopedia of Polymer Science and Engineering, vol. 13, (John Wiley & Sons, Inc. NY, NY, 1988).

Primary Examiner—Nathan M. Nutter
(74) Attorney, Agent, or Firm—Whyte Hirschboeck Dudek SC

(57) ABSTRACT

The invention is high temperature emulsion composition comprising borax and a substantially water-insoluble polymer prepared by aqueous suspension polymerizing a blend of monomers, said blend comprising a plasticizing amount by weight of at least one plasticizing alkyl acrylate monomer, a hardening amount by weight of at least one hardening alkyl acrylate monomer and a crosslinking amount by weight of at least one multi-ethylenically unsaturated monomer, in an aqueous suspension comprising a water-soluble polymer component comprising at least one acrylic polymer having carboxylate functionality, its method of use and coated substrates made therewith.

36 Claims, No Drawings

HEAT RESISTANT EMULSION RESINS

This application is a divisional of U.S. Ser. No. 08/936,256 filed Sep. 24, 1997, U.S. Pat. No. 6,162,850.

FIELD OF THE INVENTION

The present invention relates to aqueous compositions of copolymers and to their use as printing vehicles. More particularly, it relates to alkyl acrylate copolymers and their use in printing inks or varnishes particularly suited for use flexographic or gravure printing processes.

BACKGROUND OF THE INVENTION

The use of aqueous alkyl methacrylate and alkyl acrylate ester polymers as printing ink vehicles, overprint varnishes and lacquers is generally known in the art. However, several problems still exist, for example heat resistance of the dried films is low. Heat resistance is needed for many applications in inks and overprint varnishes. A major use is for printing preprint linerboard, where a high degree of hot rub resistance is needed. Another significant use is heat sealing of foil to form airtight seals (metallized balloons, coffee pouches, etc). Overprints are often used in preprint and some heat seal applications as a protective coating over standard inks. It is known that heat resistance can be improved by adding large quantities (about 4–10 wt. %) of zinc compounds such as zinc oxide or zinc ammonium carbonate (ZAC). However, the high pH of these zinc compounds leads to strong ammonia smell and large amounts of zinc can be toxic.

SUMMARY OF THE INVENTION

The invention is a high temperature emulsion composition comprising borax and a substantially water-insoluble polymer prepared by aqueous suspension polymerizing a blend of monomers, said blend comprising a plasticizing amount by weight of at least one plasticizing alkyl acrylate monomer, a hardening amount by weight of at least one hardening alkyl acrylate monomer and a crosslinking amount by weight of at least one multi-ethylenically unsaturated monomer, in an aqueous suspension comprising a water-soluble polymer component comprising at least one acrylic polymer having carboxylate functionality, its method of use and coated substrates made therewith.

DETAILED DESCRIPTION OF THE INVENTION

This invention relates to novel aqueous dispersions of polymers, to printing ink vehicles that contain these novel aqueous suspensions, and to methods that employ these novel aqueous suspensions. The aqueous dispersions of polymers are heat resistant emulsion resins that form high gloss films upon drying without the need for zinc addition.

An outline of how this is done may best be understood by starting with the formulation of a control: a water-insoluble acrylic polymer comprising a plasticizing monomer (such as 2-ethylhexyacrylate) and a hardening monomer (such as methylmethacrylate) is polymerized in an aqueous stabilizer. The stabilizer comprises at least one water-soluble acrylic polymer with carboxyl or carboxylate groups (such as polystyreneacrylic acid or polystyrenemaleic acid) and, optionally, a surfactant. Zinc is then added as zinc oxide or zinc ammonium carbonate as well as biocides, coalescents (such as glycol ether solvents), defoamers and the like. This is then used as a base for formulating printing inks, lacquers and the like.

In the absence of zinc, or when zinc is low, the heat resistance of the ink is low. The present invention eliminates the need for zinc, while maintaining, and even improving, gloss. This is done by adding multi-ethylenically unsaturated monomers (such as allylmethacrylate and triallyl cyanurate) to the plasticizing/hardening monomer mixture and then by adding borax instead of zinc compounds. Zinc compounds may, however, be added in smaller quantities than used in the past, on the order of about 0.6 wt. % if desired to achieve formulations with synergistic benefits of both approaches. As an alternative to zinc additions, zirconium ammonium carbonate, aziridine and aziridine polymers may be employed. Note that hereinafter all, quantities, except in the examples, are understood to be modified by "about."

Note that the dried film comprises at least two polymers: the initially water-soluble acrylic; and the initially water-insoluble acrylic. The initially water soluble acrylic is soluble by virtue of its being supplied as a salt of a fugitive amine such as aminomethylpropanol or ammonia, and it also becomes insoluble upon loss of the amine.

The polymers are prepared by suspension polymerization and are at least copolymers of two different alkyl acrylates and/or methacrylates and a multi-ethylenic compound. Thus, important starting materials for preparing the novel polymers of this invention are alkyl esters of acrylic acid and methacrylic acid. Such esters are described in "Acrylic and Methacrylic Ester Polymers", *Encyclopedia of Polymer Science and Engineering*, vol. 1, pp. 234–299 (John Wiley & Sons, Inc., N.Y., N.Y., 1985), the disclosure of which is incorporated herein by reference. The precise identity of each monomer and the amount of each monomer affect properties of the polymer which are important to its utility in a printing ink vehicle.

A measure of the plasticizing effect of a monomer can be found by examining the glass transition temperature of a homopolymer of the monomer. Generally, a plasticizing monomer will be such that a homopolymer of the monomer will exhibit a glass transition temperature (Tg) of less than about −30° C. Thus, acrylates of a straight chain alkyl group having from 3 to 11 carbon atoms or a branched chain alkyl group having from 5 to 11 carbon atoms will generally be useful for plasticizing the polymer. Examples of such acrylate esters that will be useful include the n-propyl, n-butyl, isobutyl, n-hexyl, 2-ethylbutyl, 2-heptyl, and 2-ethylhexyl. (Because of the relatively high $T_g$ of poly(t-butyl acrylate), the use of a monomer t-butyl acrylate is unlikely to be advantageous as a plasticizer. 2-Ethylhexylacrylate (2-EHA) is preferred.

The other alkyl acrylate or methacrylate monomer is a hardening monomer. As discussed above, a measure of the hardening effect of the monomer can be found by examining the glass transition temperature of a homopolymer of the monomer. Generally, the monomer will be selected such that a homopolymer of the monomer will exhibit a glass transition temperature ($T_g$) of greater than about 50° C. Thus, methacrylates having short chain alkyl groups, e.g. from 1 to about 4 carbon atoms, e.g. branched chain alkyl groups having from 3 or 4 carbon atoms, will generally be useful for hardening the polymer. Examples of alkyl methacrylates that will be useful include methyl, ethyl, isopropyl, sec-butyl, isobutyl, and t-butyl. Typically, the polymer will be prepared from a blend comprised of from about 35% to about 55% by weight (and preferably from about 40% to about 50%) of one or more hardening monomers. Methylmethacrylate (MMA) is preferred. The preferred ratio of 2-EHA to MMA is 95/5 to 50/50.

In addition to mono-ethylenically unsaturated monomers, the blend from which the water-insoluble polymer is prepared will also be comprised of an ethylenically unsaturated monomer having at least two sites of ethylenic unsaturation, i.e. a di- or higher multi-ethylenically unsaturated monomer. Examples of multi-ethylenic monomers include alkenyl acrylates or methacrylates (e.g. allyl methacrylate), other allyl vinyl monomers such as dially maleate and fumarate, di-alkenyl arenes, particularly di-alkenyl benzenes (e.g. divinyl benzene), di-alkenyl ethers (e.g. ethylene glycol di-allyl ether and pentaerythritol di-allyl ether), di-acrylamides (e.g. methylene-bis-acrylamide, trimethylene-bis-acrylamide, hexamethylene-bis-acrylamide, N,N'-diacryloylpiperazine, m-phenylene-bis-acrylamide, and p-phenylene-bis-acrylamide), di- or higher multi-(meth)acrylates (e.g. diethylene glycol diacrylate, propylene glycol dimethacrylate, diethylene glycol diacrylate, polyethylene glycol diacrylate, bis(4-acryloxypolyethoxyphenyl)propane, 1,5-pentanediol diacrylate, neopentyl glycol diacrylate, 1,6-hexanediol acrylate, and polypropylene glycol diacrylate, pentaerythritol triacrylate, trimethylolpropane triacrylate, pentaerythritol tetraacrylate, ethyleneglycol dimethacrylate and triethylene glycol dimethacrylate). Also useful are allyl nitogen monomers such as triallyl cyanurate and triallyl isocyanurate. Allyl methacrylate and triallyl cyanurate are preferred; they may be used at any mix ratio.

While not wishing to be held to any theory, it is believed that the multi-ethylenic monomer in combination with borax is responsible for the enhanced heat resistance of films of the heat resistant emulsion. It should be noted, however, that enhanced heat resistance is only one facet of the important properties of the emulsion and that flexibility of the film and stability of the emulsion is important as well. If the water-insoluble polymer is crosslinked to an excessive degree, it will not be sufficiently susceptible to emulsion and observable polymer coagulum may form in the emulsion during either the polymerization or the intended shelf life of the aqueous emulsion or printing vehicle prepared therefrom. Further, excessive crosslinking may make the resulting film too brittle for the intended application. Therefore, the amount of the multi-ethylenic monomer should be adjusted to obtain the desired degrees of both heat resistance on the one hand and film flexibility and emulsion stability on the other. This amount will generally be a minor amount, e.g. from about 0.01% to less than about 5% by weight of the emulsion, preferably from about 0.05% to about 3%, and more preferably from about 0.5% to about 2.0%. However, the amount of the multi-ethylenic monomer should be adjusted to obtain levels of heat resistance, film flexibility, and emulsion stability that are optimal for a given ink composition. Thus, the precise characteristics desired of the aqueous emulsion and the polymer film prepared therefrom will influence the determination of what is an optimal amount of the multi-ethylenic monomer for a given ink composition.

Further, while the water-insoluble polymer is preferably prepared from only the monomers described above without additional comonomers, other monoethylenically unsaturated polymerizable monomers may be useful in minor proportion (e.g. less than 10% by weight of the total monomer composition) as comonomers, particularly for uses other than in ink vehicles. These monomers include the vinylidene halides, vinyl halides, acrylonitrile, methacrylonitrile, vinyl esters such as vinyl formate, vinyl acetate and vinyl propionate, and mixtures of ethylene and such vinyl esters, acrylic and methacrylic acid esters of alcohol ethers such as diethylene glycol monoethyl or monobutyl ether methacrylate, $C_1$–$C_{10}$ alkyl esters of beta-acryloxypropionic acid and higher oligomers of acrylic acid, styrene and alkyl substituted styrenes and vinyl aromatics including alpha-methyl styrene, mixtures of ethylene and other alkylolefins such as propylene, butylene, pentene and the like, vinyl ethers such as methyl vinyl ether, ethyl vinyl ether, vinyl 2-methoxyethyl ether, vinyl 2-chloroethyl ether and the like. Examples of alkyl acrylate and/or alkyl methacrylate esters that may be also be useful include methyl, ethyl, isopropyl, sec-butyl, n-amyl, isoamyl, t-amyl, cyclohexyl, n-octyl, n-decyl, and n-undecyl.

Additional monoethylenically unsaturated polymerizable comonomers that may be useful in preparing the emulsion of the invention include hydroxy functional vinyl monomers such as 2-hydroxyethyl methacrylate, 2-hydroxyethyl acrylate, 3-hydroxypropyl methacrylate, butanediol acrylate, 3-chloro-2-hydroxypropyl acrylate, 2-hydroxypropyl acrylate, and 2-hydroxypropyl methacrylate. Further examples of useful monomers include the partial esters of unsaturated aliphatic dicarboxylic acids and particularly the alkyl half esters of such acids. Examples of such partial esters are the alkyl half esters of itaconic acid, fumaric acid and maleic acid wherein the alkyl group contains 1 to 6 carbon atoms. Representative members of this group of compounds include methyl acid itaconic, butyl acid itaconic, ethyl acid fumarate, butyl acid fumarate, and methyl acid maleate. Minor amounts of other comonomers, such as adhesion promoting comonomers, may also be used. These monomers may be copolymerized with acrylic monomers to yield the water-insoluble polymer.

Examples of alpha, beta-ethylenically unsaturated carboxylic acids which may also be useful as comonomers to prepare the polymer of the invention include acrylic acid, beta-acryloxypropionic acid and higher oligomers of acrylic acid and mixtures thereof, methacrylic acid, itaconic acid, aconitic acid, crotonic acid, citraconic acid, maleic acid, fumaric acid, alpha-chloroacrylic acid, cinnamic acid, mesaconic acid and mixtures thereof.

In preferred embodiments, the water-insoluble polymer is prepared by emulsion polymerization of monomers comprising:

(a) a major amount by weight (e.g. from 50% to 95% by weight, based on the total weight of the water-insoluble) of a plasticizing alkyl acrylate monomer, said alkyl being a straight chain alkyl group having from 3 to 11 carbon atoms or a branched chain alkyl group having from 5 to 11 carbon atoms, (b) a minor amount by weight (e.g. from 5% to 50% percent by weight, based on the total weight of the water-insoluble polymer) of alkyl methacrylates, said alkyl groups being selected from the group consisting of methyl, ethyl, isopropyl, sec-butyl, isobutyl, and t-butyl, and (c) a nominal amount by weight (e.g. from 0.01% to 5.0% percent by percent by weight, preferably from 0.5% to 3% percent by percent by weight, based on the total weight of the emulsion) of a multi-ethylenically unsaturated monomer, in the presence of a water-soluble styrene/acrylic or maleic anhydride copolymer having carboxylate functionality, a molecular weight of from 4,000 to 12,000, and an acid number of from 150 to 500, the weight percent of said styrene/acrylic or styrene/maleic copolymer being up to 52% of the emulsion. Generally, the water-soluble polymer will be at least partially neutralized to pH 8.4–8.5. Total monomers used to make the water-insoluble polymer are preferably from 10 to 40 wt. % of the emulsion.

The preparation of aqueous dispersions of polymers by emulsion polymerization for use in coatings applications is well known in the art. The practice of emulsion polymerization is discussed in detail in G. Poehlein, "Emulsion Polymerization", *Encyclopedia of Polymer Science and Technology*, vol. 6, pp. 1–51 (John Wiley & Sons, Inc. N.Y., N.Y., 1986), the disclosure of which is incorporated herein by reference. Conventional emulsion polymerization techniques may be used to prepare the aqueous dispersion of polymers of this invention.

The emulsion will contain a low-molecular weight, water-soluble, acrylic polymer having carboxylate functionality. These carboxylate polymer resins are of low molecular weight, e.g. from 4,000 to 12,000, as compared to the polymer prepared by the emulsion polymerization. The amount of the water-soluble, acrylic polymer can vary broadly, depending upon the precise properties desired in the emulsion and the resulting film, as discussed below. Typically, however, the amount of water-soluble, acrylic polymer will be up to 52 wt. % of the emulsion.

One of the functions of this polymer is as a suspending aid, and thus, the polymer will have sufficient carboxylate functionality to be stably dispersed in the aqueous polymerization medium. Such resins become and contribute to the polymer film prepared from the emulsion, but do not have acceptable film properties by themselves. Such resins do, however, affect various properties of the emulsion and films prepared therefrom, e.g. the resolubility of the polymer blend in the ink vehicle. Preferred compositions contain an acrylic resin having a water-solubility sufficient to impart the desired degree of resolubility to the polymers of the ink or varnish, as discussed below. By "resolubility" is meant that the polymer will redisperse in the ink vehicle while still in a wet state so that there will not be an unacceptable build up of the polymer on the printing plate or on a transfer roll used to apply the polymer to a substrate. For example, in an ink composition or with a printing apparatus that is relatively more susceptible to deposition of polymer on the transfer rolls, it may be desirable to employ a suspending aid polymer with a relatively higher acid number. Use of such a polymer may tend to increase the hydrophilicity of a film of the polymer, but should improve the resolubility of the polymer in the ink or varnish, and thus, tend to prevent deposition of the polymer on a transfer rolls used to apply the ink or varnish to a printing substrate. Conversely, if resolubility is not as important a factor for a given ink composition or varnish, or for a given printing apparatus, it may be desirable to minimize the acid number of the suspending aid resin and, thus, reduce the hydrophilicity of the film.

Preferred carboxylate polymers are vinyl aromatic/acrylic copolymers having a substantial acid number (typically 150–500, and preferably 180–460) and a moderate molecular weight (e.g. 4,000 to 12,000). Vinyl aromatic compounds are discussed in "Styrene Polymers" *Encyclopedia of Polymer Science and Engineering*, vol. 16, pp. 1–21 (John Wiley & Sons, Inc., N.Y., N.Y., 1989), the disclosure of which is incorporated herein by reference. The vinyl aromatic compounds comprise monovinyl aromatic hydrocarbons containing from 8 to 12 carbon atoms and halogenated derivatives thereof having halo-substituted aromatic moieties. Examples include styrene, alpha-methylstyrene, vinyl toluene (e.g. a 60/40 mixture by weight of meta-methylstyrene and para-methylstyrene), meta-methylstyrene, para-methylstyrene, para-ethylstyrene, para-n-propylstyrene, para-isopropylstyrene, para-tert-butylstyrene, ortho-chlorostyrene, para-chlorostyrene, alpha-methyl-meta-methylstyrene, alpha-methyl-para-methylstyrene, tert-butyl styrene, alpha-methyl-ortho-chlorostyrene, and alpha-methyl-para-chlorostyrene.

At least a portion of the acrylic units of the polymer will bear free carboxyl or carboxylate groups (the carboxyl or carboxylate form depending upon the pH of the aqueous emulsion). This carboxylate functionality is solvated by the aqueous polymerization medium and, thus, contributes to the stability of the polymer suspension. The aqueous composition should be essentially free of species which can react with or form a complex with such carboxylate functionality. Such freedom will ensure that the carboxylate functionality remains solvated by the aqueous polymerization medium and/or that the carboxylate polymer will not engage in measurable crosslinking, either in the aqueous polymerization medium or the films prepared therewith. The acrylic compounds comprise monomers such as acrylic acid, methacrylic acid, maleic anhydride and the like. poly(styrene-co-acrylic acid) and poly(styrene-co-maleic anhydride) are preferred. The monomers may be emulsified with an anionic, cationic or nonionic dispersing agent, using for example from 0.05% to 10% by weight of dispersing agent on the weight of total monomers. Combinations of anionic and nonionic emulsifiers may also be used. High molecular weight polymers such as hydroxy ethyl cellulose, methyl cellulose and polyvinyl alcohol may be used as emulsion stabilizers and protective colloids, as may polyelectrolytes such as polyacrylic acid.

Cationic dispersion agents include lauryl-pyridinium chlorides, cetyldimethyl amine acetate, and alkyldimethyl-benzylammonium chlorides in which the alkyl group has from 8 to 18 carbon atoms. Anionic dispersing agents include, for example: the higher fatty alcohol sulfates, such as sodium lauryl sulfate, and the like; alkylaryl sufonates such as sodium or potassium isopropylbenzene sulfonates or isopropyl napththalene sulfonates, and the like; alkali metal higher alkyl sulfosuccinates, such as sodium octyl sulfosuccinate, sodium N-methyl-N-palmitoyltaurate, sodium oleyl isothionate, and the like; and alkali metal salts of alkylarylpolyethoxyethanol sulfates or sulfonates, such as sodium tert-octylphenoxypolyethoxyethyl sulfate having 1 to 5 oxyethylene units, and the like.

Suitable non-ionic dispersing agents include: alkylphenoxypolyethoxyethanols having alkyl groups of from 7 to 18 carbon atoms and from 6 to 60 oxyethylene units, such as heptylphenoxypolyethoxyethanols, methyloctylphenoxypolyethoxyethanols, and the like; polyethoxyethanol derivatives of methylene-linked alkyl phenols; sulfur-containing agents such as those made by condensing from 6 to 60 moles of ethylene oxide with nonyl mercaptan, dodecyl mercaptan, and the like, or with alkylthiophenols wherein the alkyl groups contain from 6 to 16 carbon atoms; ethylene oxide derivatives of long-chained carboxylic acids, such as lauric acid, myristic acid, palmitic acid, oleic acid, and the like, or mixtures of acids such as those found in tall oil containing from 6 to 60 oxethylene units per molecule; analogous ethylene oxide condensates of long-chained alcohols such as octyl, decyl, lauryl, or cetyl alcohols, ethylene oxide derivative of etherified or esterified polyhydroxy compounds having a hydrophobic hydrocarbon chain, such as sorbitan monostearate containing from 6 to 60 oxethylene units; also, ethylene oxide condensates of long-chain or branched chain amines, such as dodecyl amine, hexadecyl amine, and octadecyl amine, containing from 6 to 60 oxyethylene units; block copolymers of ethylene oxide sections combined with one or more hydrophobic propylene oxide sections. Mixtures of alkyl benzenesulfonates and ethoxylated alkylphenols may be employed.

Also, emulsion stabilizers, i.e. water soluble polymers such as water-soluble polyalkylene oxides, may be useful. A preferred emulsion stabilizer is a polypropylene glycol having a molecular weight in the range of 1,000 to 1,500.

The borax, sodium tetraborate decahydrate, is preferably used at levels of up to 10 wt % of the emulsion, but 3 wt. % is preferred. Heat resistance improves with increasing borax, but other film properties are affected.

Glycol ether solvents may be added as coalescing agents to improve film formation. These include ethylene glycol n-butyl ether and dipropylene glycol n-butyl ether. They are generally used at levels up to 8 wt. % of the emulsion. Coalescents also comprise ethylene glycol n-propyl ether, ethylene glycol iso-propyl ether, ethylene glycol ethyl ether, ethylene glycol phenyl ether, ethylene glycol iso-butyl ether, t-butyl ether, ethylene glycol 2-ethylhexyl ether, diethylene glycol ethyl ether, diethylene glycol n-propyl ether, diethylene glycol iso-propyl ether, diethylene glycol iso-butyl ether, diethylene glycol t-butyl ether, propylene glycol n-propyl ether, propylene glycol iso-propyl ether, propylene glycol n-butyl ether, propylene glycol iso-butyl ether, propylene glycol t-butyl ether, propylene glycol methyl ether, propylene glycol phenyl ether, dipropylene glycol n-propyl ether, dipropylene glycol iso-propyl ether, dipropylene glycol n-butyl ether, dipropylene glycol iso-butyl ether, dipropylene glycol t-butyl ether, tripropylene glycol n-butyl ether, Texanol (TM Eastman Chemical, Kingsport, Tenn.) and Dymsol 200, 300 and 400 long-chain polypropylene glycols (TM Henkel Corp., Ambler, Pa.).

A polymerization initiator of the free radical type, such as ammonium or potassium persulfate, may be used alone or as the oxidizing component of a redox system, which also includes a reducing component such as potassium metabisulfite, sodium thiosulfate or sodium formaldehyde sulfoxylate. The reducing component is frequently referred to as an accelerator. The initiator and accelerator, commonly referred to as catalyst, catalyst system or redox system, may be used in proportion from 0.01% or less to 3% each, based on the weight of monomers to be copolymerized. Examples of redox catalyst systems include t-butyl hydroperoxide/sodium formaldehyde sulfoxylate/Fe(II), and ammonium persulfate/sodium bisulfite/sodium hydrosulfite/Fe(II). The polymerization temperature may be from room temperature to 90° C., or more, and may be optimized for the catalyst system employed, as is conventional. Emulsion polymerization may be seeded or unseeded. Seeded polymerization is preferred and tends to yield aqueous dispersions of latex polymer having more uniform physical properties than unseeded polymerization.

Chain transfer agents including mercaptans, polymercaptans and polyhalogen compounds are sometimes desirable in the polymerization mixture to moderate polymer molecular weight. Examples of chain transfer agents which may be used include long chain alkyl mercaptans such as t-dodecyl mercaptans, alcohols such as isopropanol, isobutanol, lauryl alcohol or t-octyl alcohol, carbon tetrachloride, tetrachloroethylene and trichlorobromoethane. Generally from 0 to 3% by weight, based on the weight of the monomer mixture, may be used.

The polymerization process may be a thermal or redox type; that is, free radicals may be generated solely by the thermal dissociation of an initiator species or a redox system may be used. A monomer emulsion containing all or some portion of the monomers to be polymerized may be prepared using the monomers, water and emulsifiers. A catalyst solution containing catalyst in water may be separately prepared. The monomer emulsion and catalyst solution may be co-fed into the polymerization vessel over the course of the emulsion polymerization. The reaction vessel itself may initially contain water. The reaction vessel may also additionally contain seed emulsion and further may additionally contain an initial charge of polymerization catalyst. The temperature of the reaction vessel during the emulsion polymerization may be controlled by cooling to remove heat generated by the polymerization reaction or by heating the reaction vessel. Several monomer emulsions may be simultaneously co-fed into the reaction vessel. When multiple monomer emulsions are co-fed, they may be of different monomer composition. The sequence and rates at which the diverse monomer emulsions are co-fed may be altered during the emulsion polymerization process. After addition of the monomer emulsion or emulsions has been completed, the polymerization reaction mixture may be chased (e.g. with t-butyl hydroperoxide and/or sodium ascorbate) to minimize the concentrations of unreacted monomer and unreacted polymerization catalyst species. The pH of the contents of the reaction vessel may also be altered during the course of the emulsion polymerization process. Both thermal and redox polymerization processes may be employed.

While the preferred use of the preferred polymers of this invention is in a printing ink vehicle, e.g. as a binder resin or a varnish, the polymer can be used in a wide variety of end-use applications. For example, it can be used in leather finishes and coatings, clear and pigmented coatings for wood and other architectural substrates, caulks, and sealants and as a binder for an exterior coating composition, such as those used to protect sprayed-in-place polyurethane foam roofing (roof mastics).

Because of the excellent film forming capabilities of the polymer, the polymer can be used in coating in general. The aqueous dispersions of the present invention can, thus, be applied to a variety of substrates to form a coating thereon. These substrates include, for example, porous stock such as paper and cardboard, wood and wood products, metals such as aluminum, copper, steel, and plastics e.g. films such as polyolefins (low density polyethylene, linear low density polyethylene, polypropylene), polyesters, (e.g. polyethylene terephthalate), polyamides, polycarbonates, acrylics and the like. The compositions are applied by methods such as spraying, rollcoating, flexo and gravure processes onto a selected substrate. The resulting coated substrate is typically allowed to dry before further processing.

The coating compositions may optionally include other substances such as pigments, resins, monomers and additives such as anti-oxidants and rheological modifiers. Methods of coating and materials used in coatings are described in *Encyclopedia of Polymer Science and Engineering*, vol. 3, pp. 552–671 and supp. vol., pp. 53, 109 and 110 (John Wiley & Sons, Inc., N.Y., N.Y., 1985), the disclosure of which is incorporated by reference.

The ink and varnish compositions of this invention can be for any of the typical ink or varnish applications such as flexographic, gravure, letterpress, ink-jet, or screen-process printing applications. The ink compositions of the present invention have excellent adhesion to a wide variety of substrates including plastic films such as polyester, polyethylene or polypropylene, aluminum foil, glass, and paper. The ink and varnish compositions of the present invention should have a pH greater than 8, e.g. typically 8.2 to 9.0.

The aqueous emulsions of this invention are particularly useful in preparing inks or varnishes that are, in turn, particularly useful in the printing of non-woven cellulosic substrates. Such substrates are sheets or other continuous webs of cellulosic fibers formed by deposition of the fibers from a suspension in such a way that the fibers are intermeshed to form a thin but compact whole. Thus, the preferred substrates can be characterized as paper. Examples of paper stocks include letter stock, bag stock, carton stock, newsprint, and so on. The inks and vanishes of this invention are particularly useful in printing packaging papers, such as bag stock and carton stock.

The printing processes most advantageously used with the inks or varnishes are the flexographic and/or gravure printing processes. One characteristic of such printing processes, is that the aqueous dispersion of ink or varnish is supplied to said surface by a hydrophilic cylindrical transfer roll. Printing processes are described by T. Sulzberg et al., "Printing Ink Vehicles", *Encyclopedia of Polymer Science and Engineering*, vol. 13, pp. 368–398 (John Wiley & Sons, Inc., N.Y, N.Y., 1988), the disclosure of which is incorporated herein by reference. Thus, this invention relates to a method of printing comprising applying a first portion of an aqueous dispersion comprised of the polymer of this invention to a first essentially impervious printing surface, said surface having recesses therein which define a resolvable image, contacting said surface with a printable substrate, and repeating said applying and said contacting with a second portion of said aqueous dispersion and a second printable surface. This method may be a letterpress printing method (wherein said recesses define raised portions of the surface which carry the aqueous dispersion to the substrate, e.g. flexography) or a gravure printing method (wherein said recesses carry the aqueous dispersion to the substrate). In flexographic printing in particular, an aqueous dispersion comprised of the polymer of this invention is applied to a flexible plate mounted on a plate cylinder. The flexible plate is then contacted with a printable substrate by rotation of the plate cylinder. In preferred embodiments, the aqueous dispersion is applied to the flexible plate with a hydrophilic cylindrical transfer roll which is rotated to successively take up and then apply successive portions of the aqueous dispersion.

The inks, overprints, and primers of this invention can be prepared, for example, as disclosed in U.S. Pat. No. 4,148,779, which is incorporated herein by reference in its entirety. For example, the printing ink, overprint, or primer may be prepared as follows. The colorant is added to the high temperature emulsion and, at a properly adjusted viscosity, dispersed thereinto with ball mill, sand mill, high-shear fluid flow mill, Cowles Dissolver, Katy Mill or the like. The colorants also may be dispersed directly in the polymer by milling on a heated two-roll mill and using processing aids as desired, such as solvents or plasticizers. The viscosity and printing characteristics of the ink composition may be modified further by addition of water, solvents, plasticizers, sequestered wax, surfactants and the like to suit the particular printing needs.

The ink compositions of the present invention are not limited to any type of dye, pigment, filler, or the like, all of which are hereinafter included in the term "colorant," and can accommodate any colorant which can be dispersed, milled, mixed, blended or dissolved in any manner in either the polymer blend, water or aqueous polymer system.

In accordance with the present invention, ink or varnish compositions prepared from the above polymer blends may be superior over prior aqueous ink or varnish compositions in one or more of such properties as pigment wetting, pigment stability, temperature stability (heat and freeze-thaw), nonsettling for extended periods of time, nonpolluting with respect to odor and volatile organics, nonflocculating, long "open" time in the press fountain, wide viscosity range inks, adhesion to a variety of substrates, hardness, gloss, drying rate on substrates, film-forming properties at low temperatures without organic co-solvents, resistance to grease, water and scuff, compatibility with other water-based inks, wet rub resistance, ink mileage characteristics (considerable water dilution allowable at the press), ink press stability in general, printability (clean, sharp transfer without "stringing or misting"), trapping, easy clean up, nonplugging of printing plates, flexibility, redispersibility or rewetting, crinkle resistance, solvent resistance, alkali, chemical and detergent resistance, blocking resistance, lightfastness, heat resistance, slip angle, coefficient of friction, toughness, substrate wetting, hold-out, opacity, dry-rate, and no offset on the printing press (coating e.g. on tension rollers).

The heat resistant emulsions of the present invention have the hot rub resistance, gloss and printability for an ink or overprint in pre-print. They also have the flexibility, adhesion, heat seal resistance and gloss to be used in heat seal applications.

The following examples will serve to further illustrate the invention, but should not be construed to limit the invention, unless expressly set forth in the appended claims. All parts, percentages, and ratios are by weight unless otherwise indicated in context.

EXAMPLES

Heat Resistant Emulsion Preparation

All of the resins set forth below were prepared by the following general procedure. The starting materials were premixed as seven separate charges in the amounts set forth below. G-CRYL 630 is a 28–32 wt. % ammoniacal solution of poly(styrene-co-acrylic acid) having a molecular weight of 7–10,000 (TM Henkel Corp, Ambler, Pa.); SMA-1000H is poly(styrene-co-maleic anhydride) with an acid value of 460 and a molecular weight of 1000–5000 available from Elf Atochem, Philadelphia, Pa.; Polyglycol P-1200 is a 1200 molecular weight polypropyleneglycol available from Dow Chemical, Midland, Mich.

|  | Weight Percent |
|---|---|
| CHARGE 1 -Stabilizer | |
| G-CRYL 630 | 26.09 |
| SMA 1000H | 26.09 |
| Water | 21.72 |
| Triton X-305 (nonionic surfactant, Union Carbide) | 0.73 |
| CHARGE 2- Initiator | |
| Ammonium Persulfate | 0.17 |
| Water | 0.84 |
| CHARGE 3- Monomers | |
| 2-EHA | 12.20 |
| MMA | 2.01 |
| Triallyl Cyanurate | 0.74 |
| Allyl Methacrylate | 0.45 |
| CHARGE 5a-Chaser | |
| t-butylhydroperoxide | 0.23 |
| CHARGE 5b-Chaser | |
| Sodium Ascorbate | 0.11 |
| Water | 0.45 |

-continued

| | Weight Percent |
|---|---|
| CHARGE 6-Borax and Additives | |
| Polyglycol P-1200 | 0.66 |
| Borax (Sodium Tetraborate Decahydrate) | 3.24 |
| Ethylene glycol n-butyl ether | 3.24 |
| Dipropylene glycol n-butyl ether | 0.93 |
| Tektamer 38AD Biocide (Calgon Corp.) | 0.10 |
| | 100.00 |

The emulsion was prepared by the following steps:
1. Blanket the reactor with nitrogen.
2. Heat Charge 1 in the reactor to 176° F.
3. Pump 10% of Charge 3 from monomer tank into the reactor.
4. Add Charge 2 to the reactor with stirring.
5. Meter the remaining Charge 3 from the monomer tank into the reactor over a 100 minute period at 176° F.
6. Hold at 176° F. for 1 hour.
7. Add Charge 5a to the reactor, mix 5 minutes.
8. Add ⅓ of Charge 5b to the reactor, mix 5 minutes.
9. Add ⅓ of Charge 5b to the reactor, mix 5 minutes.
10. Add ⅓ of Charge 5b to reactor, mix for 1 hour at 176° F.
11. Cool to 120° F.
12. Pump Charge 6 into reactor, mix 15 minutes.

The resulting heat resistant emulsion was milky, translucent free from free monomer, had a pH of 8.5–9.0, had a viscosity of 2–10 poise and was 40–45 wt. % solids.

Examples 1–4, 6–8, 10–13 and Comparative Examples 5, 9 and 14

Formulas were prepared of the heat resistant emulsion above and a control emulsion with no borax or multiethylenically unsaturated monomers, but with 4 wt. % ZAC. The formulas are shown in Tables 1, 3 and 5. Additional ingredients include: G/S cyan blue pigment dispersion from Sun Pigments Division—; Zinc Oxide, as 15% zinc ammonium carbonate solution (=0.6 parts total ZAC when used at 4 pbw); PolyFluo 190 micronized wax from Micro Powders; 5789 Wax micronized wax from Shamrock Wax; 325N35 wax emulsion from Chemcor, East Rutherford, N.J., MPP635G from Micro Powders, Tarrytown, N.Y.; and Foamaster V and Dehydran 1620 antifoams (both TM Henkel Corp.).

The properties of films made from the formulas are shown in Tables 2, 4 and 6 respectively. Heat Resistance is reported as hot rub & heat seal tests—10 is no removal, 1 is all ink removed. Gloss is as reflectance with a 60° angle gloss meter. Resolubility data was obtained using the scale—10 is best 1 is worst. Rub Resistance is measured by ink removal—50 cycles/4 lbs.—10 is no removal, 1 is all ink removed. Block Resistance is measured as ink block—1 PSI/60° C./16 hours—10 is no cling, 1 is bad block. Transparency is based on a visual rating where 10 is best and 1 is worst.

Hot scuff ink formulations. Example 1 is a preferred formula for use on porous substrates (pre-print or other) or on non-porous substrates for good flexibility and adhesion along with the maximum heat and rub resistance. Example 2 is a version of Example 1 with higher gloss, no zinc and better adhesion and flexibility. Example 3 is an improved rub resistant ink containing an alternate wax.

TABLE 1

| EXAMPLE | 1 | 2 | 3 |
|---|---|---|---|
| Pigment Dispersion | 40.0 | 40.0 | 40.0 |
| Heat Resistant Emulsion | 54.7 | 58.7 | 54.7 |
| Zinc Oxide | 4.0 | — | 4.0 |
| PolyFluo 190 | 1.0 | 1.0 | — |
| 5789 Wax | — | — | 1.0 |
| Foamaster V | 0.3 | 0.3 | 0.3 |
| | 100.0 | 100.0 | 100.0 |

TABLE 2

| EXAMPLE | 1 | 2 | 3 |
|---|---|---|---|
| Hot Scuff Resistance | 8 | 7 | 8 |
| Gloss | 42 | 44 | 39 |
| Resolubility | 10 | 10 | 10 |
| Rub Resistance | 9 | 9 | 10 |
| Block Resistance | 9 | 9 | 9 |
| Wet Block Resistance | 9 | 8 | 9 |

Heat seal ink formulations. Example 4 is a preferred formula for use in heat seal applications. Example 5 is an improved rub and block resistant ink using a micronized wax. Example 6 is a better gloss and transparency version of Example 4 without zinc.

TABLE 3

| EXAMPLE | 4 | 5 | 6 |
|---|---|---|---|
| Pigment Dispersion | 40.0 | 40.0 | 40.0 |
| Heat Resistant Emulsion | 51.7 | 54.7 | 55.7 |
| Zinc Oxide | 4.0 | 4.0 | — |
| 325N35 | 4.0 | — | 4.0 |
| PolyFluo 190 | — | 1.0 | — |
| Dehydran 1 620 | 0.3 | 0.3 | 0.3 |
| | 100.0 | 100.0 | 100.0 |

TABLE 4

| EXAMPLE | 4 | 5 | 6 |
|---|---|---|---|
| Heat Seal Resistance | 9 | 9 | 7 |
| Gloss | 42 | 40 | 44 |
| Transparency | 9 | 8 | 10 |
| Resolubility | 10 | 10 | 10 |
| Rub Resistance | 9 | 10 | 9 |
| Block Resistance | 9 | 9 | 9 |

Overprint formulations. Example 7 is a preferred heat resistant overprint formulation. Example 8 is a higher gloss version of Example 7. Example 9 is a better rub version of Example 7 with micronized wax.

TABLE 5

| EXAMPLE | 7 | 8 | 9 |
|---|---|---|---|
| Heat Resistant Emulsion | 89.0 | 93.0 | 94.5 |
| 325N35 | 6.7 | 6.7 | — |
| MPP635G | — | — | 1.2 |
| Zinc Oxide | 4.0 | — | 4.0 |
| Dehydran 1620 | 0.3 | 0.3 | 0.3 |
| | 100.0 | 100.0 | 100.0 |

TABLE 6

| EXAMPLE | 7 | 8 | 9 |
| --- | --- | --- | --- |
| Heat Resistance | 9 | 6 | 9 |
| Gloss | 51 | 53 | 46 |
| Resolubility | 10 | 10 | 10 |
| Rub Resistance | 8 | 7 | 10 |
| Block Resistance | 10 | 10 | 10 |

What is claimed is:

1. A method of coating a substrate comprising:
   (i) contacting a surface of a substrate with a high temperature emulsion composition comprising borax and a substantially water-insoluble polymer prepared by aqueous suspension polymerizing a blend of monomers, said monomers comprising:
      (a) at least one plasticizing alkyl acrylate monomer;
      (b) at least one hardening alkyl (meth)acrylate monomer; and
      (c) at least one multi-ethylenically unsaturated crosslinking monomer,
   in an aqueous suspension comprising a water-soluble polymer component comprising at least one acrylic polymer having carboxylate functionality; and
   (ii) drying said surface to form a heat resistant film in contact with said surface.

2. The method as claimed in claim 1 wherein said borax is present at up to about 10 wt. % of the emulsion.

3. The method as claimed in claim 1 wherein said borax is present at about 3 wt. % of the emulsion.

4. The method as claimed in claim 1 wherein said plasticizing monomer is an alkyl acrylate, said alkyl being selected from the group consisting of straight chain alkyl groups of from 3 to 11 carbon atoms and branched chain alkyl groups having from 5 to 11 carbon atoms.

5. The method as claimed in claim 1 wherein said plasticizing monomer is 2-ethylhexyl acrylate.

6. The method as claimed in claim 1 wherein said hardening monomer is an alkyl methacrylate, said alkyl being selected from the group consisting of alkyl groups of from 1 to 4 carbon atoms.

7. The method as claimed in claim 1 wherein said hardening monomer is methyl methacrylate.

8. The method as claimed in claim 1 wherein said at least one multi-ethylenically unsaturated monomer is selected from the group consisting of allyl methacrylate, triallyl cyanurate and mixtures thereof.

9. The method as claimed in claim 1 wherein said at least one multi-ethylenically unsaturated monomer is present in an amount of from about 0.01% to about 5% by weight of the heat resistant emulsion.

10. The method as claimed in claim 1 wherein said blend of monomers consists essentially of plasticizing monomers in an amount from about 50% to about 95% by weight of the blend, hardening monomers in an amount from about 5% to about 50% by weight of the blend, and a crosslinking monomer in an amount from about 0.5% to about 3% by weight of the emulsion.

11. The method as claimed in claim 1 wherein said blend of monomers consists essentially of:
   an alkyl acrylate as said plasticizing monomer, said alkyl being selected from the group consisting of n-propyl, n-butyl, isobutyl, n-hexyl, 2-ethylbutyl, 2-heptyl, and 2-ethylhexyl and in an amount from about 5% to about 95% by weight;
   an alkyl methacrylate as said hardening monomer, said alkyl being selected from the group consisting of methyl, ethyl, isopropyl, sec-butyl, isobutyl, and t-butyl and in an amount from about 5% to about 50% by weight; and
   a multi-ethylenically unsaturated monomer selected from the group consisting of allyl methacrylate, triallyl cyanurate and mixtures thereof in an amount from about 0.5% to about 3% by weight of the emulsion.

12. The method as claimed in claim 11 wherein said plasticizing monomer is 2-ethylhexyl acrylate, said hardening monomer is methyl methacrylate and said multi-ethylenic monomer is selected from the group consisting of allyl methacrylate, triallyl cyanurate and mixtures thereof.

13. The method as claimed in claim 1 wherein said water soluble acrylic polymer having carboxylate functionality is selected from the group consisting of poly(styrene-co-acrylic acid), poly(styrene-co-maleic acid) and mixtures thereof.

14. The method as claimed in claim 1 wherein said water-soluble acrylic polymer having carboxylate functionality is present up to about 52 wt. % of the emulsion.

15. The method as claimed in claim 1 wherein said low molecular weight, water-soluble acrylic polymer having carboxylate functionality is a styrene/acrylic copolymer having an acid number of about 150 to about 500 and a molecular weight of about 4,000 to about 12,000.

16. The method as claimed in claim 1 wherein said acrylic polymer has an acid number of about 180 to about 460.

17. The method as claimed in claim 1 wherein said emulsion further comprises at least one zinc compound.

18. The method as claimed in claim 17 wherein said zinc compound is selected from the group consisting of zinc oxide, zinc ammonium carbonate and mixtures thereof.

19. The method as claimed in claim 18 wherein said zinc compound is present at about 0.6 wt. % of the emulsion.

20. The method of claim 1 wherein said heat resistant emulsion further comprises at least one coalescent agent.

21. The method of claim 20 wherein said coalescent agent is at least one glycol ether.

22. The method of claim 21 wherein said glycol ether is selected from the group consisting of ethylene glycol n-butyl ether, dipropylene glycol n-butyl ether and mixtures thereof.

23. The method as claimed in claim 1 wherein said method of coating a substrate comprises:
   (i) contacting a surface of a substrate with a high temperature emulsion composition comprising borax, a coalescent agent and a substantially water-insoluble polymer prepared by aqueous suspension polymerizing a blend of monomers, said blend comprising:
      (a) 2-ethylhexyl acrylate;
      (b) methyl methacrylate; and
      (c) a multi-ethylenically unsaturated monomer selected from the group consisting of allyl methacrylate, triallyl cyanurate and mixtures thereof,
   in an aqueous suspension comprising poly(styrene-co-acrylic acid) and poly(styrene-co-maleic acid); and
   (ii) drying said surface to form a heat resistant film in contact with said surface.

24. In a method of printing a substrate using a flexographic or gravure printing apparatus, wherein the improvement comprises applying to said substrate a printing vehicle composition comprising a high temperature emulsion comprising borax and a substantially water-insoluble polymer prepared by aqueous suspension polymerizing a blend of monomers, said blend comprising:
   (i) at least one plasticizing alkyl acrylate monomer;
   (ii) at least one hardening alkyl acrylate monomer; and (iii) at least one multi-ethylenically unsaturated monomer, in an aqueous suspension comprising a water-soluble polymer component comprising at least one acrylic polymer having carboxylate functionality.

25. The method of claim 24 comprising applying a first portion of said aqueous dispersion to a first essentially impervious printing surface, said surface having recesses therein which define a resolvable image, contacting said surface with a printable substrate, and repeating said applying and said contacting with a second portion of said aqueous dispersion and a second printable surface.

26. The method of claim 24 wherein said heat resistant emulsion is further comprised of a coalescent agent.

27. A method of coating a substrate comprising:
(i) contacting a surface of a substrate with a high temperature emulsion composition comprising borax and a substantially water-insoluble polymer prepared by aqueous suspension polymerizing a blend of monomers, said monomers comprising:
(a) about 50% to about 95% by weight of the blend of at least one plasticizing alkyl acrylate monomer, wherein the alkyl is selected from the group consisting of straight chain alkyl groups of from 3 to 11 carbon atoms and branched chain alkyl groups having from 5 to 11 carbon atoms;
(b) about 5% to about 50% by weight of the blend of at least one hardening alkyl(meth)acrylate monomer wherein the alkyl is selected from the group consisting of alkyl groups of from 1 to 4 carbon atoms; and
(c) about 0.01% to about 5% by weight of the emulsion of at least one multi-ethylenically unsaturated crosslinking monomer, in an aqueous suspension comprising a water-soluble polymer component comprising at least one acrylic polymer having carboxylate functionality; and
(ii) drying said surface to form a heat resistant film in contact with said surface.

28. The method as claimed in claim 27 wherein said borax is present at up to about 10 wt. % of the emulsion.

29. The method as claimed in claim 27 wherein said at least one multi-ethylenically unsaturated monomer is selected from the group consisting of allyl methacrylate, triallyl cyanurate and mixtures thereof.

30. The method as claimed in claim 27 wherein said at least one multi-ethylenically unsaturated monomer is present in an amount of from about 0.5% to about 3% by weight of the heat resistant emulsion.

31. The method as claimed in claim 27 wherein said plasticizing monomer is 2-ethylhexyl acrylate.

32. The method as claimed in claim 27 wherein said hardening monomer is methyl methacrylate.

33. The method as claimed in claim 27 wherein said at least one multi-ethylenically unsaturated monomer is selected from the group consisting of allyl methacrylate, triallyl cyanurate and mixtures thereof.

34. The method as claimed in claim 27 wherein said emulsion further comprises at least one zinc compound.

35. The method as claimed in claim 34 wherein said zinc compound is selected from the group consisting of zinc oxide, zinc ammonium carbonate and mixtures thereof.

36. The method as claimed in claim 27 wherein said zinc compound is present at about 0.6 wt. % of the emulsion.

* * * * *